Aug. 25, 1964   J. H. COTTON   3,145,448
CAPACITOR FABRICATION
Filed July 5, 1960   3 Sheets-Sheet 2
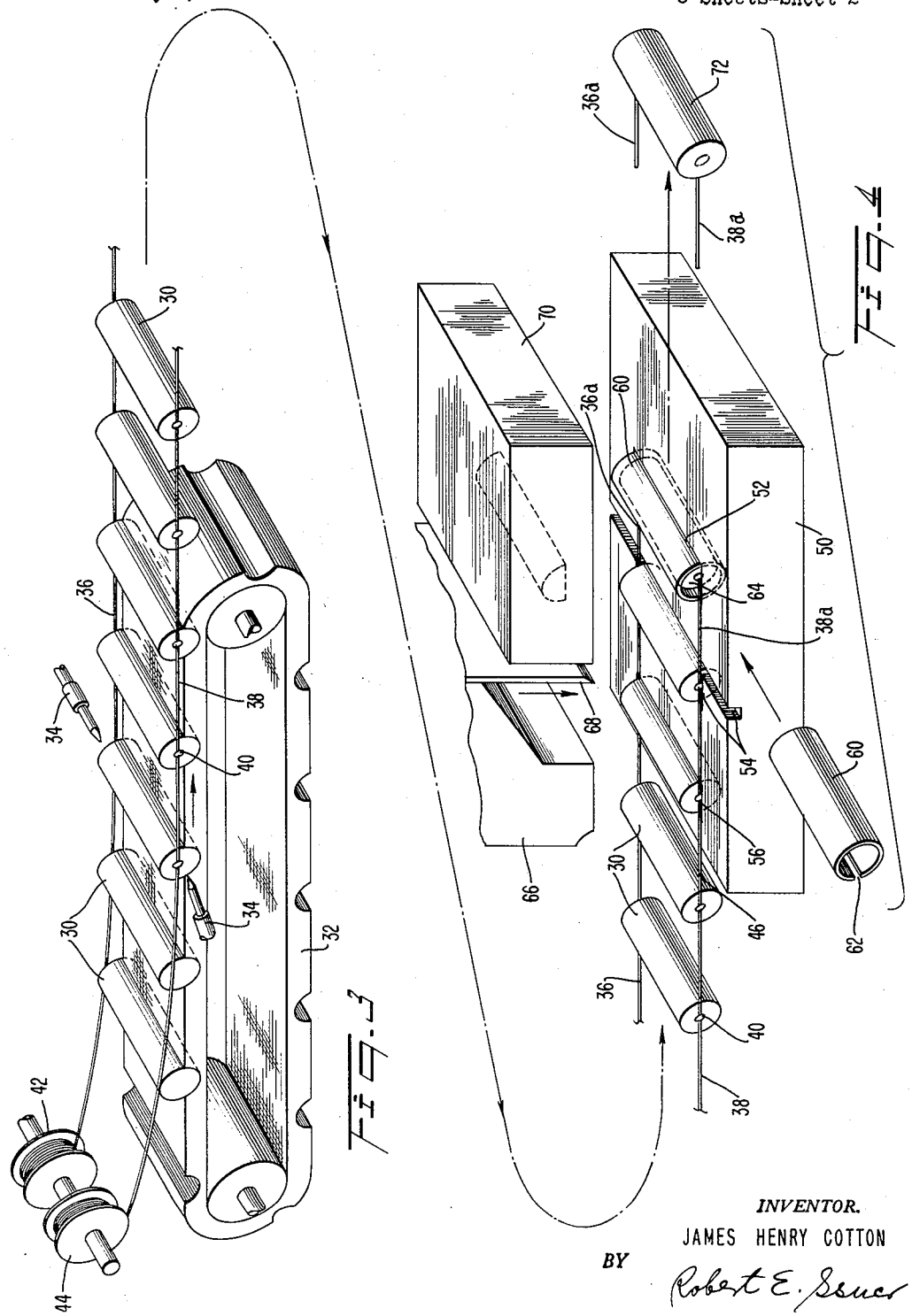
INVENTOR.
JAMES HENRY COTTON
BY Robert E. Sauer
ATTORNEY Aug. 25, 1964     J. H. COTTON     3,145,448
CAPACITOR FABRICATION Filed July 5, 1960     3 Sheets-Sheet 3

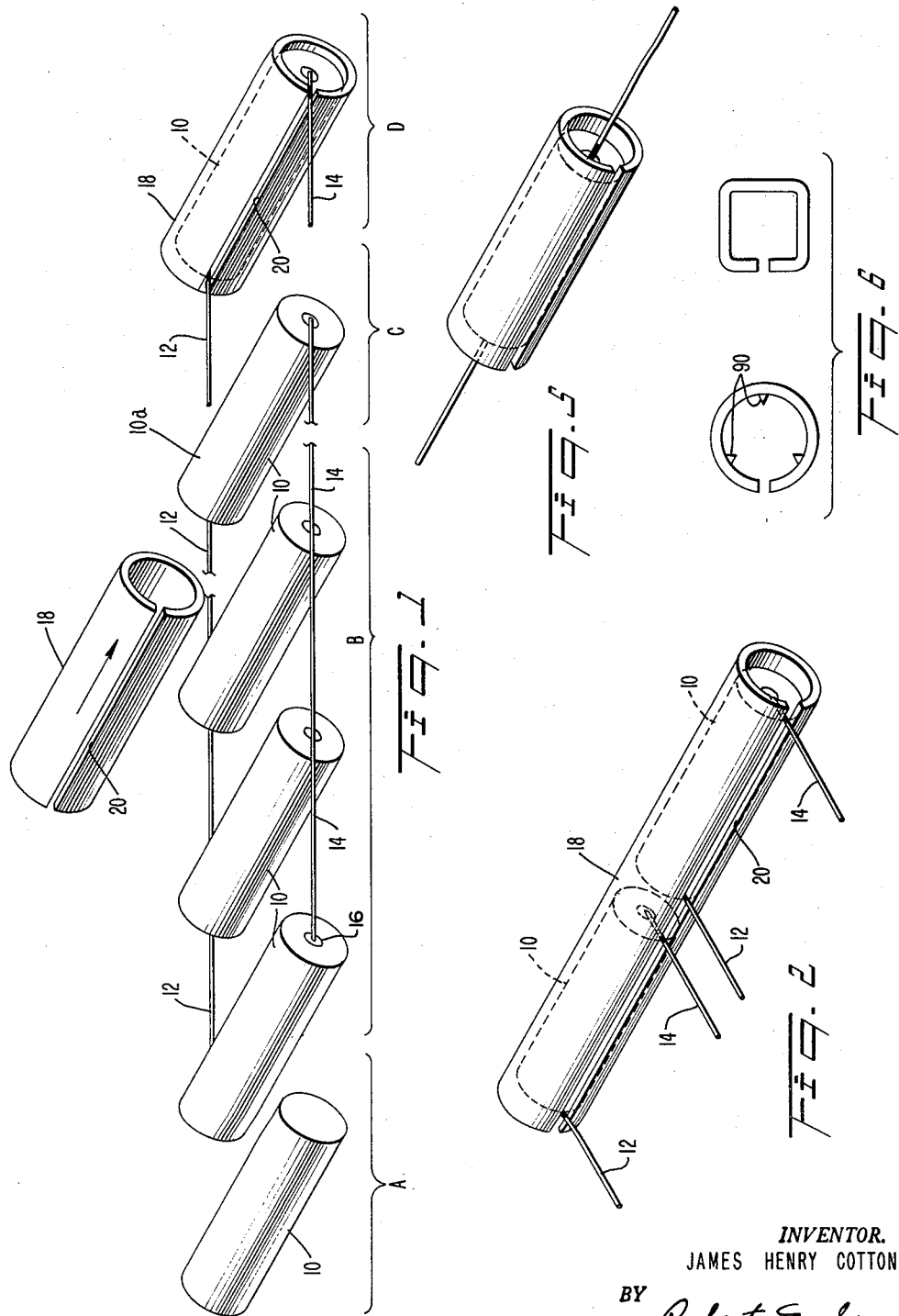

INVENTOR.
JAMES HENRY COTTON
BY Robert E. Isner
ATTORNEY

United States Patent Office 3,145,448
Patented Aug. 25, 1964

3,145,448
CAPACITOR FABRICATION
James Henry Cotton, London, England, assignor to Cornell-Dubilier Electric Corporation, a corporation of Delaware
Filed July 5, 1960, Ser. No. 40,905
8 Claims. (Cl. 29—25.42)

This invention relates to capacitor manufacture and particularly to a method of producing encapsulated capacitors of the kind consisting of dielectric layers wound spirally into a roll with interleaved conducting layers constituting the electrodes of the capacitor, the two terminals of the capacitor projecting radially with respect to the axis of the roll and from opposite ends thereof and such rolled capacitor element being enclosed by an insulating encapsulation.

In such kind of capacitor, the terminals may be connected to the electrodes of the capacitor in various ways. For example the conducting layers may be constituted by metal foil strips, each electrode projecting up to or extending slightly beyond one end of the rolled element and stopping short of the other end so that terminals can be secured, for example by soldering, to such metal foil strips. Alternatively the conducting layers may be constituted by metallized layers which either may each extend up to one end of the rolled element and stop short of the other so that the terminals can be connected to such layers or, alternatively, may each stop short of each end of the rolled element so that the terminals can be connected to terminal tabs inserted into the rolled element at opposite ends thereof in contact with the respective metallized layers.

The highly competitive nature of the capacitor business has created continual pressures for the development of better quality and lower cost tubular units. One method used in recent years has included molding the tubular capacitor sections within a casing, such as Bakelite, and which, in practice, has resulted in an inordinate number of unsatisfactory and hence rejected units for various reasons.

With respect to this latter type of capacitor casing one general fabrication method that is widely used by the art employs preformed pellets or slugs of suitable thermosetting casing material placed in a mold in surrounding relation to a capacitor section. The subsequent application of high pressure oftentimes results in damage to the capacitor section or in undesired displacement of the capacitor section within the mold with the consequent result of non-uniform casing thickness in the finished products, shearing of terminals, trapping of air, improper closure around the wire leads resulting in moisture absorption and other defects well known to those skilled in this art. Numerous attempts have been made to avoid many of these undesirable results outlined above. Such attempts have included the use of preformed sleeves of casing material and preformed containers sized to receive the sections; however, the required fabrication steps to assure proper positioning of the capacitor section within the sleeve, the necessary use and introduction of filler material and the difficulties of avoidance of entrapped air bubbles to assure mass production of satisfactory high quality units has resulted in undue expense and cost.

This invention may be briefly described as an improved method for fabricating capacitors of the tubular type. In its broader aspects it includes a fabrication method incorporating the steps of preliminarily encasing a capacitor section within a relatively closely fitting open ended slotted sleeve, placing this capacitor section containing sleeve in a mold and injecting or otherwise introducing compatible liquid casing material into said mold to fill all voids therewithin and to merge with the sleeve material and form a unitary enclosed casing for said capacitor section. Other aspects of the herein disclosed invention include the provision of a manufacturing method that is peculiarly adapted for automation techniques and for automatic or semi-automatic fabrication operation on a mass production basis.

Among the advantages of the herein disclosed invention is the provision of uniformly encased capacitors of a high quality at a comparatively lower cost and which results in a materially reduced and minimal number of rejected units for defective casings or for other faults, some of which are mentioned above. Other advantages, which will be apparent to those skilled in this art, are the avoidance of capacitor section displacement within the casing with its inherent deficiencies, the minimization of manipulative fabrication operations, the permitted simultaneous fabrication of a plurality of units by automated mass production fabrication techniques, the utilization of inexpensive and readily available materials and the production of finished products in arrangements that facilitate testing, packaging and ready use for continuous assembly operations in the fabrication of electronic components.

The object of the present invention is to provide an improved and inexpensive method of producing encapsulated capacitors of the above described kind.

Other objects and advantages of the invention will be pointed out in the following disclosure and claims and will be apparent to those skilled in this art from the accompanying drawings which disclose, by way of illustrative example, the principles underlying the invention and provide, by way of schematic representation, the essentials of suitable apparatus by which said principles may be usefully employed in the commercial manufacture of tubular capacitors.

Referring to the drawings:

FIGURE 2 is a schematic view of a plurality of units arranged for simultaneous fabrication in accordance with the principles of this invention.

FIGURES 3 and 4 are schematic representations of the essentials of suitable apparatus, in flow diagram arrangement, for automatically effecting the method of this invention.

FIGURE 5 is a schematic view of an alternate capacitor construction readily fabricated in accordance with the principles of this invention.

Figure 1:
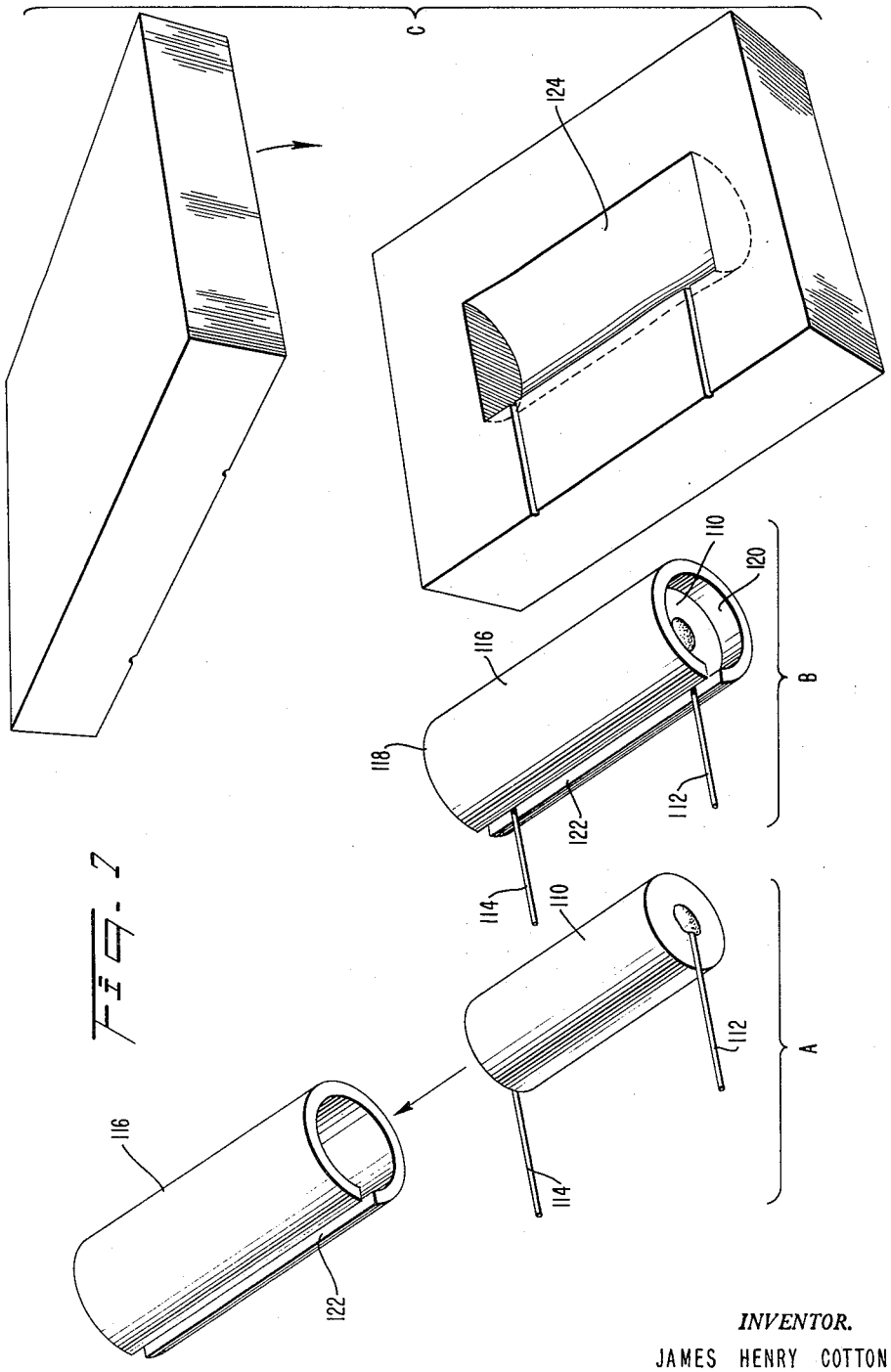
FIGURE 1 is a schematic flow diagram of the fabrication steps in the formation of encapsulated tubular capacitors in accordance with the principles of this invention.

FIGURE 6 includes two side elevational views of alternative insulating sleeve configurations.

FIGURE 7 is a schematic flow diagram of the fabrication steps in the formation of a single capacitor.

By way of general introduction, and referring initially to FIGURE 7, the fabrication method broadly includes utilization of a generally cylindrically shaped convolutely wound capacitor section 110 having radially extending terminal leads 112, 114, as illustrated at A. The capacitor section 110 is inserted into a slotted sleeve 116 which fits relatively closely around the section 110, to form a preliminarily encased capacitor section 118, as illustrated at B. The sleeve 116 is conveniently made of an insulating thermoplastic material such as polyethylene, polypropylene or nylon and is of sufficient length to project beyond each end of the section 110, as at 120. The wall thickness of the sleeve 116 is chosen so as to provide effective insulation, efficient sealing and good mechanical strength of the encapsulated component. When the terminals project radially from the capacitor element, as illustrated, the slot 122 in the sleeve 116 permits the section 110 to be inserted endwise therein and moved along the sleeve 116 as may be desired. One end of the sleeve 116 may be partly closed, for example, by means of a diametrical cross piece or small projections extending radially inwards, to assure at least a minimal depth of casing thickness at said location in the event of capacitor section displacement during the molding operation.

The capacitor element and surrounding sleeve as illustrated at B are then placed in a mold 124 shaped and sized to match the sleeve 116, as illustrated at C, so that the final encapsulation is of substantially even thickness around the capacitor element. An insulating molding material, for example, a thermoplastics material the same as that from which the sleeve is made, is then injected into the mold 124. Such molding material is introduced into the mold at a temperature above its hardening temperature so that it flows readily into all the unoccupied space within the mold. The slot 122 in the sleeve 116 more easily permits the release of air which might otherwise become trapped in the finished molding. The molding material is preferably injected into the mold at a point adjacent to the center of the slot in the sleeve, but may alternatively be introduced at any other convenient point of the mold. The temperature of the mold during the molding process is below the hardening temperature of the molding material, but preferably is at a sufficiently high temperature to ensure that the molding material cools only relatively slowly. This ensures that all the free space within the mold is completely filled. The hot thermoplastics molding material merges readily with the exposed parts of the sleeve 116 of the same thermoplastics material so as to form an effectively integral encapsulation on cooling. The sleeve 116 is sufficiently longer than the capacitor section 110 to ensure a depth of encapsulation at the end or each end of such section which provides an efficient seal around the terminal wires 112, 114.

As mentioned earlier, the herein disclosed invention is particularly directed to a mass production fabrication method. In its broad aspects, such method preferably includes utilization of a preformed tubular capacitor section 10 as illustrated in FIGURE 1 at A. The capacitor section 10 may be conventional in nature and, as illustrated, is in the form of a convolutely wound tubular unit of interleaved conducting and dielectric strips or alternatively a convolutely wound strip or strips of metallized dielectric media.

As set forth at B in FIGURE 1, each rolled capacitor element 10 of a series thereof is positioned transversely to and between two parallel lengths of wire 12, 14 so that its axis is parallel to and spaced from the axis of the previously and similarly positioned capacitor element, the two electrodes (or terminal tabs respectively connected thereto) of each capacitor element at opposite ends thereof are connected respectively to the two wire lengths, as by soldering at 16, so as to form a ladder-like configuration. Such securement of the terminal leads permits utilization of long lengths of terminal lead wire and obviates the necessity of severing the wire prior to securement thereof to the capacitor electrodes. This not only facilitates automatic terminal wire feeding and capacitor section positioning for automatic soldering or welding operations in mass production fabrication but also results in the fabrication of a self-supporting ladder-like arrangement in which the "rungs" are constituted by successive capacitor sections 10 as generally illustrated at B in FIGURE 1. The disclosed ladder-like arrangement permits of appreciable manufacturing economics since it may function as an integral capacitor subassembly conveyor and facilitates the desired positioning of the lead capacitor section for the next step in the fabrication method forming the subject matter of the invention.

Each capacitor element fed to the mold is preferably correctly located therein by insulating means made of a material which will bond with the insulating molding material so as to form an effectively integral encapsulation around each capacitor element. In the preferred method, the insulating locating means preferably consists of a slotted sleeve 18 of insulating material which is preferably positioned around each rolled capacitor element 10 after such capacitor element has been disconnected from the previous capacitor element in the series thereof and before it is fed to the mold.

The preferred method includes the displacement of an open ended slotted tubular sleeve 18 into surrounding relation with the lead capacitor section 10 of the ladder-like configuration thereof, as illustrated at C in FIGURE 1. The slotted sleeve 18 may be precut to a desired length or alternatively it may, if desired, be formed in long lengths and advanced in a substantially straight line, as indicated by the arrow when the lead capacitor section 10A is suitably located and positioned in its path of advance. After such displacement of an elongate sleeve 18 into surrounding relation with one or a plurality of aligned capacitor sections, it may then be left in such condition for the subsequent molding operations and then severed to form individual units or it may be suitably severed prior to the molding operation to form a plurality of discrete units. In each case the subassembly formed of one or more sleeve encased capacitor sections may conveniently be termed as either a preliminarily encased capacitor section or a capacitor section containing slotted sleeve.

The slotted sleeve 18 is preformed of suitable thermoplastic material such as polyethylene, nylon, mylar, various high melting point waxes or other suitable casing materials having the desired thermoplastic properties. As shown at D in FIGURE 1 for a single preliminarily encased capacitor section, the sleeve 18 is shaped so as to position the contained capacitor section 10 therein. Longitudinally, the sleeve 18 is preferably longer than the capacitor section 10 by an amount at least equal to the desired depth of casing material to be disposed at the ends of the finished capacitor section. The wall thickness of the sleeve may be preselected to provide desired electrical and physical characteristics in the finished unit. As shown in the drawings, the sleeve 18 is provided with a suitable longitudinal slot 20 which, in addition to permitting the disposition of the sleeve 18 in surrounding relation with the capacitor section 10 by longitudinal displacement thereof by provision of a channel for the extending terminal leads, prevents the trapping of air in the subsequent molding operation.

As will be apparent to those skilled in this art, the above step of displacing the slotted sleeve 18 into surrounding relation with the capacitor section 10 or a plurality of such sections is one that can readily be effected by automatic machine operation and by mass production techniques. In addition, the longitudinal centering of the section 10 within the sleeve 18 can also be readily effected.

After the above described preliminary encasing of the capacitor section 10 by the slotted sleeve 18, the subassembly, as then constituted, is placed in a suitably shaped mold. The mold is preferably shaped to closely contain the capacitor section containing sleeve 18 and thereby effect automatic centering thereof and to provide for the desired finished shape of the ultimate product. With the capacitor section containing sleeve 18 so disposed, a compatible liquid thermoplastic casing material is introduced into the mold to fill all of the unoccupied space within and around the sleeve and around the capacitor section contained therein and merge with the sleeve surfaces and form, upon setting, a unitary casing for the capacitor section.

The liquid material should preferably be of the identical character as the material employed for the sleeve 18 so as to flow into all the unoccupied space within the mold and readily merge or marry with the exposed surfaces of the sleeve and provide a finished unit casing that is integral in character, although in some cases different material of the desirable thermoplastic and functional properties may be used. As is well known to those skilled in the art, it is necessary to maintain the mold temperature below the critical setting temperature of the thermoplastic materials employed and to maintain the mold within a temperature range that will permit the introduced liquid, which at the time of introduction is at or above the critical setting temperature, to flow and fill all the unoccupied space within the sleeves and merge with the exposed sleeve surfaces prior to solidification thereof. After the molding operation has been completed, the extending terminal lead wires may be severed, if such has not been effected earlier, adjacent the next succeeding capacitor section to permit the preliminary encasing thereof as described above. As mentioned above, however, the terminal wires may be severed prior to the molding operation or during the molding operation depending upon the exigencies of the particular molding apparatus employed. Upon removal from the mold, the finished encased capacitor is ready for the next operation, such as testing, marking, etc., or, if plurality of capacitor sections are simultaneously molded, severing of the molded product into discrete units.

In a preferred method, the rolled capacitor elements 10 of the ladder-like configuration are fed in succession to the mold, and prior to effecting the encapsulation of each such capacitor element in the mold, the capacitor element next to be encapsulated is disconnected from the preceding capacitor element in the series thereof by cutting each of the two wire lengths at a point immediately adjacent to the capacitor element next to be encapsulated, the two wire portions severed from the ladder-like configuration constituting the terminals of such preceding capacitor element. Conveniently, the rolled capacitor element next to be encapsulated may be disconnected from the preceding capacitor element while such preceding capacitor element is located in the mold. Preferably, while such rolled capacitor element next to be encapsulated is undergoing disconnection from the capacitor element in the mold, the following capacitor element in the series thereof is held fixed in a clamp.

In a modified method of mass producing capacitors by the use of a slotted sleeve as illustrated in FIGURE 2 a plurality of capacitor sections 10 in ladder-like configurations may simultaneously be fed to the mold in spaced side by side relationship with the axes of corresponding capacitor elements of the respective configurations in alignment, the mold being of a shape and design to accommodate such row of aligned capacitor elements simultaneously and the insulating locating means consisting of an elongated slotted sleeve 18 which is positioned around the row of aligned capacitor elements next to be encapsulated, whereby such aligned row of elements emerge from the mold as a single encapsulated body. Subsequently, the encapsulated body may be cut at appropriate positions along its length in order to produce individual encapsulated capacitors, testing of such capacitors preferably being carried out before such cutting takes place.

The invention may be carried into practice in various ways but a preferred method of encapsulating capacitors according thereto will now be described, in conjunction with FIGURES 3 and 4 of the drawings, by way of example.

In such preferred method, as shown in FIGURE 3, a series of rolled capacitor elements 30 having dielectric and conducting layers arranged in any one of the ways previously described, are positioned on a forwardly moving carrier 32, suitably of the endless belt type, so that the axes of such capacitor elements are in spaced parallel relationship. The capacitor elements are carried forwardly to soldering means 34 whereat the electrodes at opposite ends of each successive capacitor element are attached, as at 40, to two continuous lengths of wire 36, 38 extending parallel to the carrier respectively on opposite sides thereof, such two wires being continuously drawn from spools 42, 44 due to the forward movement of the carrier and the capacitor elements carried thereby. The forward movement of the carrier is effected in steps equal to the distance between the axes of adjacent capacitor elements in the series thereof. The ladder-like formation, generally designated 46, constituted by the capacitor elements 30 and the interconnecting wires 36, 38 is fed, as shown in FIGURE 4 to a combined clamping, wire-cutting and molding means including a base block 50, the front portion of which is formed as the lower half of a mold 52 for receiving one capacitor element of the series thereof, the central portion of which is formed with a locating recess 54 for the next capacitor element of the series so that the interconnecting wires 36, 38 can be cut adjacent thereto and the rear portion of which is formed as the lower half of a clamp 56 for the next following capacitor element of the series.

The ladder-like formation 46 leaves the carrier before reaching the combined clamping, wire cutting and molding means and each capacitor element 30 is automatically advanced through such combination means by the movement of the following capacitor elements. During each stepped movement, a slotted sleeve 60 is positioned around the leading capacitor element 30 of the ladder-like configuration as it advances from the wire-cutting position 54 to the mold 52, the previous capacitor element having been disconnected from such leading capacitor element and ejected from the mold after encapsulation therein (as will be later described). The slotted sleeve 60 is inserted endwise over such leading capacitor element, the wires 36, 38 interconnecting such leading capacitor element with the following capacitor element passing through the slot 62 in the sleeve, and conveniently such sleeve is made longer than the capacitor element so that it projects beyond opposite ends of such element. When the leading capacitor element 64 surrounded by the slotted sleeve 60 is located in the lower half of the mold 52, the upper half of the clamp 66 for the following capacitor element but one, a wire-cutting tool 68 and the upper half of the mold 70 are lowered simultaneously, the clamp 66, 56 acting to hold the ladder-like configuration 46 in a firmly fixed position while the wire-cutting tool 68 severs the wires 36, 38 interconnecting the capacitor element 64 in the mold 52, 70 from the following capacitor elements at points of such wires as close as practicable to such following capacitor element. The short cut ends of such wires projecting from the following capacitor element are enclosed by the sleeve 60 subsequently positioned around such element. The wire lengths 36a, 38a remaining connected to the capacitor element 64 in the mold constitute the terminal wires thereof. After molding has been completed, the encapsulated element 72 is then ejected from the mold after the upper half of such mold 70, together with the wire-cutting tool 68 and the upper half of the clamp 66, have been raised.

Conveniently, the slotted sleeve 60, which acts to locate correctly the capacitor element 64 undergoing encapsulation with respect to the walls of the mold, is made of an insulating thermoplastics material, such as polyethylene or polypropylene or nylon, which will bond or merge with the molding material. Such molding material may also be made of an insulating thermoplastics material, conveniently the same as that of which the sleeve 60 is made, and is injected into the mold as a liquid. The mold is maintained at a temperature which permits the molding material slowly to harden as it cools, such molding material in the meantime having filled all the unoccupied space within the mold so that, with the slotted sleeve 60, it ultimately forms an effectively integral encapsulation efficiently sealing the capacitor element. The slot 62 in the sleeve 60 may also act to permit more readily the release of air which might otherwise become trapped in the finished molding. The molding material fills the ends of the sleeve 60 projecting beyond the end of the capacitor element 64, and the sleeve 60 is made sufficiently longer than the capacitor element 64 to provide a depth of encapsulation at the ends thereof which ensures a good seal around the terminal wire connections.

The above-described method may be modified by simultaneously forming a plurality, for example ten, of ladder-like configurations in spaced side by side relationship with the corresponding capacitor elements of the respective configurations in axial alignment. The plurality of ladder-like configurations are simultaneously fed to the combination clamping, wire-cutting and molding means, the mold being large enough to accommodate at once a whole row of aligned capacitor elements and the wire-cutting and clamping means also being modified to operate on all the ladder-like configurations simultaneously. As the leading row of capacitor elements advances from the wire-cutting position to the mold, an elongated slotted sleeve is positioned around such row of elements, whereby, during molding, the molding material fills not only the ends of the sleeve and the slot therein but also the spaces in such sleeve between adjacent capacitor elements in the row. The row of capacitor elements thus emerges from the mold with a common encapsulation and such row of capacitors may conveniently be tested before the elongated body of encapsulation is cut at appropriate points along its length to form a plurality of encapsulated capacitors.

FIGURE 5 shows an alternative capacitor construction that readily adapts itself to the fabrication method herein described. In this embodiment the terminal leads 80 are disposed coaxially with the capacitor section 10. The coaxial disposition may be formed at the time of securement of the terminal leads to the capacitor section electrode elements or may be effected by bending the severed terminals leads from the position illustrated in FIGURE 1C to the desired axial disposition prior to the molding operation.

FIGURE 6 illustrates certain alternative configurations for the slotted insulating sleeve. The left hand sketch shows the use of positioning ridges 90 which are readily includable by proper design of the extrusion die employed in the fabrication of the sleeve. The right hand sketch shows a rounded corner rectangularly shaped insulating sleeve and is intended to illustrate the variations that may be readily introduced in sleeve shape to facilitate use thereof.

It will be appreciated that the above-described method may be modified in various ways within the scope of the invention. For example, additional clamping means for firmly holding the terminal wires attached to the capacitor element being encapsulated may be employed for correctly locating such element. Further, it is not essential for the capacitor element undergoing molding to be disconnected from the following capacitor element until after the molding operation has been completed, and that the encapsulation in the mold can be carried out in various ways other than that specifically described.

It will also be apparent to those skilled in this art, the above described fabrication method requires only inexpensive and readily available materials, embraces manipulative operations that can readily be effected by automatic or semi-automatic machinery on a mass production basis, avoids utilization of the high pressures that heretofore have resulted in damage and consequent inordinate number of rejects, permits simultaneous operation upon a plurality of units and generally permits fabrication of satisfactorily encapsulated high quality capacitors at reduced costs.

Having thus described my invention, I claim:

1. In the fabrication of encapsulated electrical capacitors, the steps of: transversely positioning unencapsulated capacitor sections in spaced relation intermediate two parallel lengths of wire with their electrode elements selectively connected thereto to form a ladder-like series thereof, positioning the lead capacitor section in said series relative to the walls of a mold by interposition of a longitudinally slotted sleeve of insulating material intermediate said section and the mold walls of a thickness at least equal to the minimal desired depth of encapsulation and introducing compatible liquid encasing material into said mold to fill all voids therewithin and to merge, upon solidification thereof, with said slotted sleeve to form a unitary enclosed casing for said capacitor.

2. The fabrication steps as set forth in claim 1 including the step of severing the lead capacitor in said assemblage from the remainder thereof closely adjacent the next adjacent capacitor to permit disposition of said slotted insulating sleeve thereabout.

3. In the fabrication of encapsulated electrical capacitors, the steps of transversely positioning unencapsulated capacitor sections in sequential spaced relationship intermediate two parallel lengths of wire with their electrode elements selectively connected thereto to form an advanceable ladder-like series thereof, surrounding the lead capacitor section in said series with a longitudinally slotted sleeve of insulating material of a thickness at least equal to the minimal desired depth of encapsulation to form a preliminarily encased capacitor section having the electrode element connected wires extending outwardly through the slot in said slotted sleeve introducing said preliminarily encased capacitor section into a mold and introducing compatible liquid encasing material into said mold to fill all voids therewithin and to merge, upon solidification thereof, with said slotted sleeve of insulating material to form a unitary enclosed casing for said capacitor section.

4. The fabrication steps as set forth in claim 3 including the step of severing the lead capacitor section in said series subsequent to the disposition of the insulating sleeve thereabout from the remainder thereof by severance of said wires closely adjacent the next succeeding capacitor section in said series to permit subsequent disposition of a slotted insulating sleeve thereabout.

5. The fabrication steps as set forth in claim 3 including the step of severing the lead and preliminarily encased capacitor section from said series prior to introduction thereof into said mold.

6. The fabrication steps as set forth in claim 3 including the step of severing the lead and preliminarily encased capacitor section from said series subsequent to introduction thereof into said mold.

7. In the fabrication of encapsulated electrical components, the steps of selectively connecting said components in transverse spaced relation intermediate two parallel lengths of wire to form a wire connected advanceable ladder-like series thereof, longitudinally advancing a longitudinally slotted sleeve of insulating material into encasing relation with the lead component in said ladder-like series to form a preliminarily encased capacitor section introducing said preliminarily encased capacitor section into a mold and introducing compatible liquid encasing material into said mold to merge, upon solidification thereof, with said insulating means to form a unitary enclosed casing for said component.

8. In the fabrication of encapsulated electrical capacitors the steps of transversely positioning unencapsulated capacitor sections in spaced relation intermediate pluralities of pairs of parallel lengths of wire with their electrode elements selectively connected thereto to form a plurality of aligned wire connected advanceable ladder-like series thereof, positioning the lead capacitor sections of each of said series thereof relative to the walls of a mold by interposition of a common longitudinally slotted sleeve of insulatig material therebetween, introducing compatible liquid encasing material into said mold to merge, upon solidification thereof, with said slotted sleeve to form a unitary enclosed casing for said capacitors and severing said casing intermediate said sections to form individually encased capacitors.

References Cited in the file of this patent

UNITED STATES PATENTS

| | | |
|---|---|---|
| 2,385,386 | Stoffel | Sept. 25, 1945 |
| 2,758,183 | Canegallo | Aug. 7, 1956 |
| 3,012,273 | Lewis | Dec. 12, 1961 |

FOREIGN PATENTS

| | | |
|---|---|---|
| 66,972 | Denmark | June 7, 1948 |
| 913,938 | Germany | June 21, 1954 |
| 305,554 | Switzerland | May 2, 1955 |

OTHER REFERENCES

Germany, N 6,225, Mar. 1, 1956.